US012366269B2

United States Patent
Shimanaka

(10) Patent No.: US 12,366,269 B2
(45) Date of Patent: Jul. 22, 2025

(54) CAM CLUTCH

(71) Applicant: TSUBAKIMOTO CHAIN CO., Osaka (JP)

(72) Inventor: Yoshihito Shimanaka, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/983,929

(22) Filed: Dec. 17, 2024

(65) Prior Publication Data

US 2025/0116303 A1 Apr. 10, 2025

Related U.S. Application Data

(63) Continuation of application No. PCT/JP2023/014585, filed on Apr. 10, 2023.

(30) Foreign Application Priority Data

Jul. 21, 2022 (JP) .................... 2022-116424

(51) Int. Cl.
*F16D 41/08* (2006.01)
*F16D 41/07* (2006.01)
*F16D 127/06* (2012.01)

(52) U.S. Cl.
CPC .......... *F16D 41/084* (2013.01); *F16D 41/07* (2013.01); *F16D 2127/06* (2013.01)

(58) Field of Classification Search
CPC ........ F16D 41/07; F16D 41/08; F16D 41/084; F16D 2127/06
See application file for complete search history.

(56) References Cited

U.S. PATENT DOCUMENTS 5,429,219 A 7/1995 Itoh et al.
6,026,942 A 2/2000 Saiko et al.
(Continued)

FOREIGN PATENT DOCUMENTS

| JP | 6-344793 A | 12/1994 |
| JP | 11-247903 A | 9/1999 |
| JP | 2011-231828 A | 11/2011 |

OTHER PUBLICATIONS

International Search Report dated Jun. 20, 2023, issued in counterpart International Application No. PCT/JP2023/014585. (2 pages).
(Continued)

*Primary Examiner* — Richard M Lorence
(74) *Attorney, Agent, or Firm* — WHDA, LLP

(57) ABSTRACT

Provided is a cam clutch that prevents occurrence of cam jamming. The cam clutch includes a first contact surface member (130) and a second contact surface member (140) that have cam contact surfaces respectively which come into contact with a first cam (170a) and a second cam (170b) that are engaged with an outer race (110) and an inner race (160) in mutually different directions. The first contact surface member (130) and the second contact surface member (140) are provided at different positions in a rotation axis direction and configured to be independently movable in a circumferential direction relative to an outer race main body (120). The outer race main body (120) has a first movement restricting portion (122) and a second movement restricting portion (123) that restrict the movement of the first contact surface member (130) and the second contact surface member (140) in respective locking directions.

4 Claims, 4 Drawing Sheets

(56) References Cited

U.S. PATENT DOCUMENTS 9,212,707 B2 * 12/2015 Kato ................ F16D 41/07
2022/0056963 A1 * 2/2022 Nakagawa ............ F16D 41/07

OTHER PUBLICATIONS

Written Opinion of the International Searching Authority (Form PCT/ISA/237) dated Jun. 20, 2023, issued in counterpart International Application No. PCT/JP2023/014585. (3 pages).

* cited by examiner

CAM CLUTCH

TECHNICAL FIELD

The present invention relates to a cam clutch configured to be switchable between operation modes.

BACKGROUND ART

As a clutch that controls transmission and interruption of a rotational force, a 2-way clutch switchable between driving and idling in both forward and reverse rotation directions is known.

For example, Patent Literature 1 describes a clutch configured to control a retainer that retains each of a first sprag and a second sprag that are biased by a biasing means in opposite rotation locking directions so as to be switchable between three operations modes which are a two-way free mode that allows two-way rotation in the forward and reverse rotation directions, a one-way lock mode that allows rotation only in the forward rotation direction while prohibiting rotation in the reverse rotation direction, and a one-way lock mode that allows rotation only in the reverse rotation direction while prohibiting rotation in the forward rotation direction.

CITATION LIST

Patent Literature

[Patent Literature 1] Japanese Patent Application Publication No. 2011-231828

SUMMARY OF INVENTION

Technical Problem

However, in the two-way clutch described above, when the operation mode is to be changed, the retainer is controlled to forcibly tilt each of the first sprag and the second sprag, and therefore a two-way lock mode that prohibits relative two-way rotation of an outer race and an inner race with respect to each other in the forward and reverse rotation directions cannot be implemented.

In addition, in the two-way clutch described above, the first sprag and the second sprag are biased so as to come into contact with the outer race and the inner race and consequently, when torque acts on the outer race or the inner race, one of the sprags tilts so as to immediately start engagement with the outer race and the inner race, while another sprag continues to be in slidable contact with the outer race and the inner race and maintains an engagement standby state.

When the torque is removed, one of the sprag tilts in a disengagement direction to shift into an idling state but, at this time, during a period before the one of the sprags is disengaged, the other of the sprags tilts in an engagement direction to start engagement with the outer race and the inner race, which may possibly result in "jamming" in which all the cams are simultaneously engaged.

In such a state, all the sprags are engaged with each other in a state of high surface pressures and therefore, when the operation mode of the clutch is to be switched from a lock mode that prohibits relative rotating operations of the outer race and the inner race in either one or both of forward and reverse directions to a free mode that allows relative rotating operations of the outer race and the inner race in the both directions, a large force is required to change attitudes of the sprags, which may possibly damage engagement surfaces of the sprags engaging with the outer race and the inner race as well as respective raceway surfaces of the outer race and the inner race, thereby reducing a service life of the clutch. In addition, there is another problem in that a high rigidity is required of an attitude changing member for changing the attitudes of the sprags.

The present invention has been made on the basis of the foregoing circumstances, and an object thereof is to provide a cam clutch that prevents occurrence of cam jamming, allows an operation mode to be smoothly switched with an extremely light force, and can be reduced in size.

Solution to Problem

The present invention solves the problems described above by providing a cam clutch including: an outer race and an inner race that are coaxially provided to be capable of relative rotation with respect to each other; and a plurality of cams arranged in a circumferential direction between the outer race and the inner race, the plurality of cams including a first cam and a second cam that are engaged with the outer race and the inner race in mutually different directions, the cam clutch further including: an operation mode switching mechanism that acts on at least one of the first cam and the second cam to switch an operation mode, the outer race or the inner race including an outer race main body or an inner race main body and a first contact surface member and a second contact surface member that have cam contact surfaces respectively which come into contact with the first cam and the second cam, the first contact surface member and the second contact surface member being provided at different positions in a rotation axis direction and configured to be independently movable in the circumferential direction relative to the outer race main body or the inner race main body, the outer race main body or the inner race main body having a first movement restricting portion and a second movement restricting portion that restrict the movement of the first contact surface member and the second contact surface member in respective locking directions.

Advantageous Effects of Invention

According to claim 1 of the present invention, the first contact surface member and the second contact surface member that have the cam contact surfaces respectively which come into contact with the first cam and the second cam are included, the first contact surface member and the second contract surface member are provided at the different positions in the rotation axis direction and configured to be independently movable in the circumferential direction relative to the outer race main body or the inner race main body, and the outer race main body or the inner race main body has the first movement restricting portion and the second movement restricting portion that restrict the movement of the first contact surface member and the second contact surface member in the respective locking directions. As a result, in a case of a two-way lock mode in which both of the first can and the second cam are operable, the first contact surface member or the second contact surface member moves depending on a rotational load direction to cause backlash and, when a rotational load state is changed, the cam under no rotational load, which is either the first cam or the second cam, can be brought into a state where the cam is not engaged with the first contact surface member or the second contact surface member due to backlash movement. Therefore, in a state where no torque is generated between the outer race and the inner race, occurrence of jamming in which the first cam and the second cam are simultaneously engaged with the outer race and the inner race is avoided.

Consequently, when the two-way lock mode is changed to another mode, it is possible to smoothly tilt the cam with an extremely light force, and a high rigidity and a large drive force are no longer required for the operation mode switching mechanism, and therefore a size reduction can be achieved.

According to claim 2 of the present invention, it is possible to use the biasing member that performs the biasing in the unlocking direction to reliably move the first contact surface member or the second contact surface member and cause backlash, and the jamming in which the first cam and the second cam are simultaneously engaged with the outer race and the inner race is more reliably avoided.

According to claim 3 of the present invention, with the one spring, the first contact surface member or the second contact surface member can reliably be moved, resulting in a simpler structure.

According to claim 4 of the present invention, the movement of the first contact surface member or the second contact surface member becomes only movement resulting from slight relative rotation of the outer race and the inner race for the engagement with the cam in the two-way lock mode, and therefore a member that limits the movement need not be provided, and a configuration of the outer race or the inner race can further be simplified.

DESCRIPTION OF EMBODIMENTS

Figure 1:
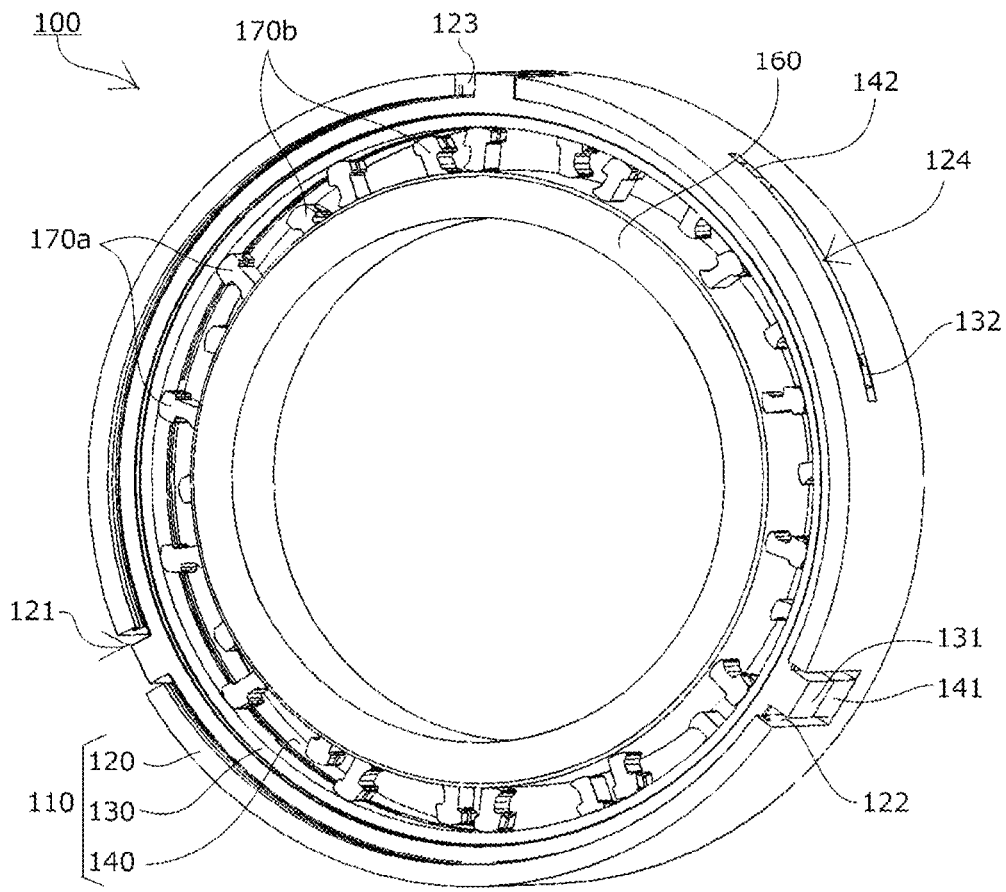
FIG. 1 is a perspective view of a cam clutch in an embodiment of the present invention from which an operation mode switching mechanism is omitted.
Figure 2:
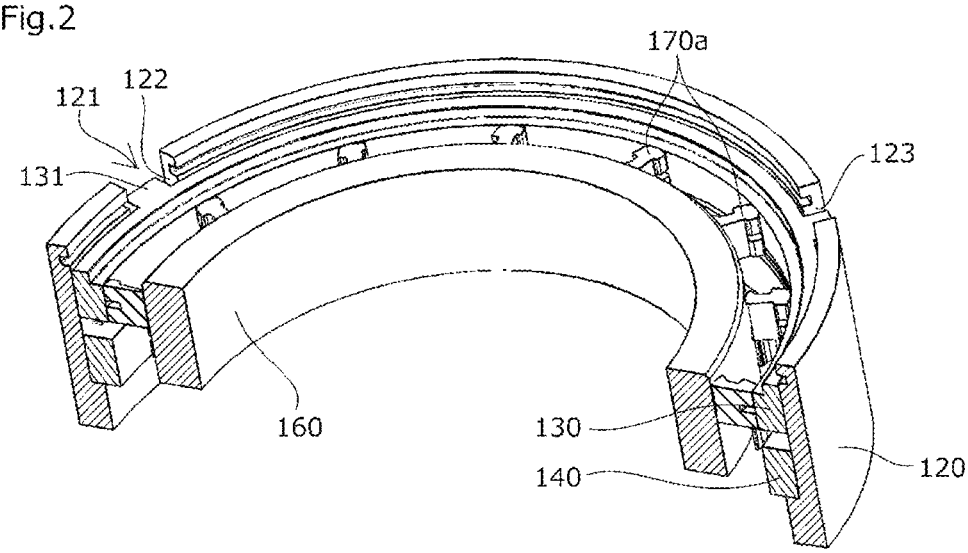
FIG. 2 is a cross-sectional perspective view of the cam clutch illustrated in FIG. 1 resulting from cutting along a plane including a rotation axis thereof.
Figure 3:
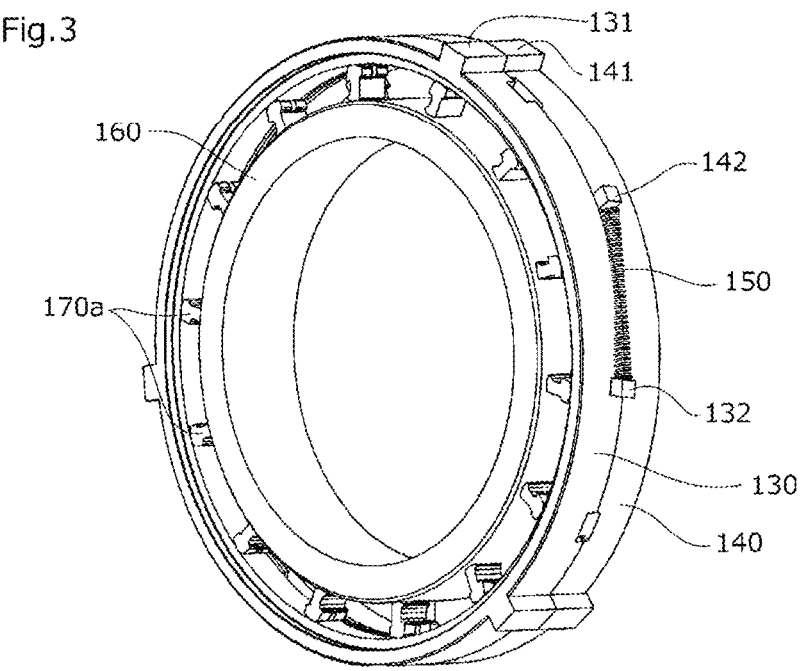
FIG. 3 is a perspective view of the cam clutch illustrated in FIG. 1 from which an outer race main body is omitted.

As illustrated in FIG. 1 to FIG. 3, a cam clutch 100 in an embodiment of the present invention includes an outer race 110 and an inner race 160 that are coaxially provided to be capable of relative rotation with respect to each other and a plurality of first cams 170a and second cams 170b that serve as engagement elements arranged in an annular space between the outer race 110 and the inner race 160 to be spaced apart from each other in a circumferential direction and perform torque transmission and interruption between the outer race 110 and the inner race 160.

The outer race 110 includes an outer race main body 120, a first contact surface member 130 having a cam contact surface which comes into contact with the first cams 170a, and a second contact surface member 140 having a cam contact surface which comes into contact with the second cams 170b, and the first contact surface member 130 and the second contact surface member 140 are provided at different positions in a rotation axis direction and configured to be independently movable in the circumferential direction with respect to the outer race main body 120.

The outer race main body 120 has movement restricting grooves 121 each including a first movement restricting portion 122 and a second movement restricting portion 123 that restrict movement of the first contact surface member 130 and the second contact surface member 140 in respective locking directions, and a first movement restricting projection portion 131 of the first contact surface member 130 and a second movement restricting projection portion 141 of the second contact surface member 140 project into the movement restricting grooves 121 to restrict respective movement ranges thereof in the circumferential direction.

In the present embodiment, the movement restricting grooves 121 are provided at three locations in the circumferential direction, but may also be provided at not more than two locations or four or more locations.

The first contact surface member 130 and the second contact surface member 140 respectively have a first biasing projection portion 132 and a second biasing projection portion 142 and, in the present embodiment, by using a spring 150 serving as a biasing member provided so as to pull the first biasing projection portion 132 and the second biasing projection portion 142 together, the first contact surface member 130 and the second contact surface member 140 are biased in an unlocking direction.

The first biasing projection portion 132, the second biasing projection portion 142, and the spring 150 are contained in a biasing member containing groove 124 provided in the outer race main body 120.

In the present embodiment, the biasing member containing groove 124 is provided at one location in the circumferential direction, but may also be provided at each of two or more locations.

Note that, in the same manner as in a known cam clutch, biasing means that bias the plurality of respective cams in an engagement direction so as to bring the cams into contact with the outer race 110 and the inner race 160, cage rings coaxially provided between the outer race 110 and the inner race 160 to be rotatable together with the outer race 110 or the inner race 160 and retain the plurality of individual cams, and the like are included, though not shown.

In addition, an operation mode switching mechanism that acts on the first cams 170a and the second cams 170b to change attitudes thereof and thereby switch an operation mode is included, though not shown.

The first cams 170a and the second cams 170b are engaged with the outer race 110 and the inner race 160 in different directions and have, e.g., outer shapes identical to each other in the present embodiment, and what is obtained by reversing each of the first cams 170a front-to-back is used as each of the second cams 170b.

The first cams 170a and the second cams 170b are disposed to be alternately arranged equidistantly in the circumferential direction.

The arrangement of the first cams 170a and the second cams 170b is not particularly limited, and the first cams 170a and the second cams 170*b* need not necessarily be disposed so as to be alternately arranged in the circumferential direction. In addition, the number of the first cams 170*a* may also be different from the number of the second cams 170*b*.

The first cams 170*a* and the second cams 170*b* are configured to have constricted portions at center portions thereof in a radial direction and be substantially hourglass-shaped.

The engagement direction of each of the first cams 170*a* is a counterclockwise direction in FIG. 1 (hereinafter referred to as the "reverse rotation direction"), and the first cam 170*a* is configured to be engaged with the outer race 110 and the inner race 160 as a result of rotation of the outer race 110 in the reverse rotation direction or rotation of the inner race 160 in a clockwise direction (hereinafter referred to as the "forward rotation direction") in FIG. 1.

The engagement direction of each of the second cams 170*b* is the forward rotation direction, and the second cam 170*b* is configured to be engaged with the outer race 110 or the inner race 160 as a result of rotation of the outer race 110 in the forward rotation direction or rotation of the inner race 160 in the reverse rotation direction.

Using the operation mode switching mechanism not shown, the cam clutch in the present embodiment is switchable between four operation modes which are a forward rotation direction lock mode that prohibits relative rotation of the outer race 110 and the inner race 160 with respect to each other in the forward rotation direction, a reverse rotation direction lock mode that prohibits relative rotation of the outer race 110 and the inner race 160 with respect to each other in the reverse rotation direction, a two-way lock mode that prohibits relative rotation of the outer race 110 and the inner race 160 with respect to each other in both of the forward rotation direction and the reverse rotation direction, and a two-way free mode that allows relative rotation of the outer race 110 and the inner race 160 with respect to each other in both of the forward rotation direction and the reverse rotation direction.

In the present embodiment described above, as the biasing member that biases the first contact surface member 130 and the second contact surface member 140 in the unlocking direction, the spring 150 that pulls the first biasing projection portion 132 and the second biasing projection portion 142 together is provided, but the biasing member is not limited thereto.

Figure 4:
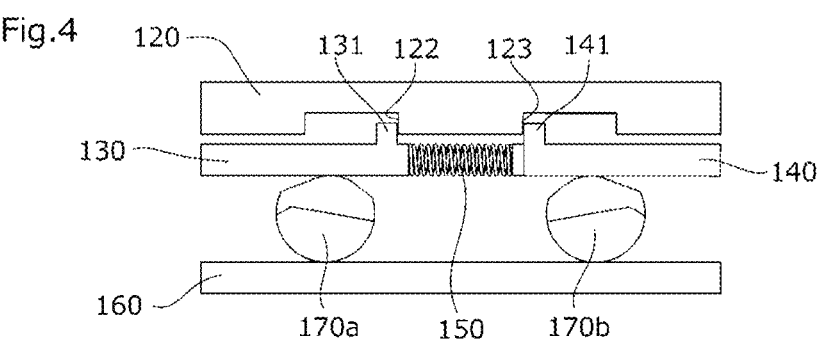
FIG. 4 is a schematic view of a cam clutch in a second embodiment of the present invention.

For example, as schematically illustrated in FIG. 4, it may also be possible to provide the spring 150 that presses the first contact surface member 130 and the second contact surface member 140 in a direction away from each other.

Figure 5:
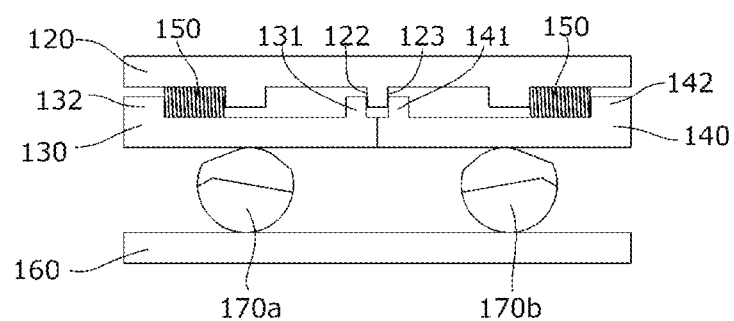
FIG. 5 is a schematic view of a cam clutch in a third embodiment of the present invention.

Alternatively, as illustrated in FIG. 5, it may also be possible to provide the respective independent springs 150 between the first biasing projection portion 132 and the outer race main body 120 and between the second biasing projection portion 142 and the outer race main body 120.

Figure 6:
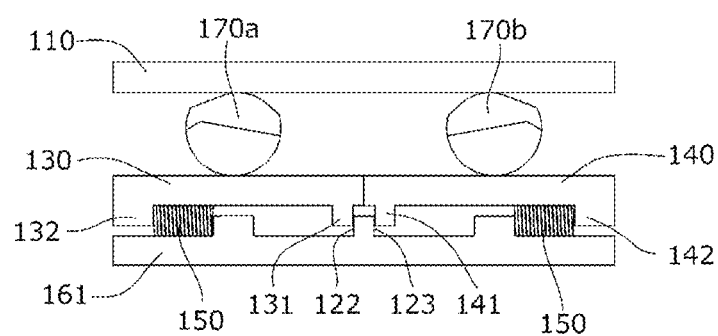
FIG. 6 is a schematic view of a cam clutch in a fourth embodiment of the present invention.

In addition, in the embodiment described above, the outer race 110 includes the outer race main body 120, the first contact surface member 130, and the second contact surface member 140, while the first cams 170*a* and the second cams 170*b* are configured to come into contact with the inner race 160, the first contact surface member 130 and the second contact surface member 140 but, as illustrated in FIG. 6, it may also be possible that the inner race 160 includes an inner race main body 161, the first contact surface member 130, and the second contact surface member 140, while the first cams 170*a* and the second cams 170*b* are configured to come into contact with the outer race 110, the first contact surface member 130, and the second contact surface member 140.

Figure 7:
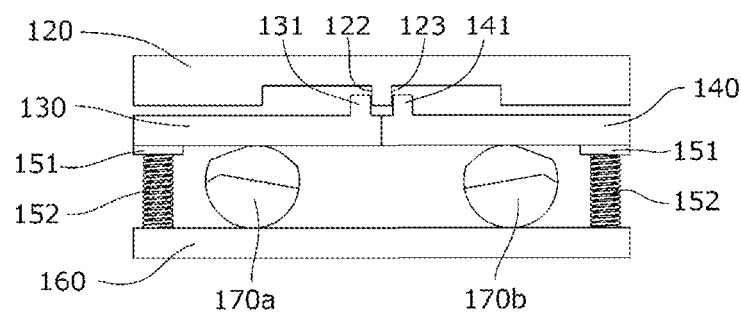
FIG. 7 is a schematic view of a cam clutch in a fifth embodiment of the present invention.

As will be described later, since the biasing in the unlocking direction is for causing movement of each of the first contact surface member 130 and the second contact surface member 140 in an amount equal to an amount of the movement of the inner race 160 in a direction of the movement of the inner race 160, as illustrated in FIG. 7, instead of the spring 150 that performs the direct biasing in the unlocking direction, a configuration that presses friction portions 151 from the inner race 160 against the first contact surface member 130 and the second contact surface member 140 via compression springs 152 may also be used.

A description will be given below of an operation of the cam clutch 100 according to the present invention in comparison with a conventional cam clutch 500.

Figure 8:
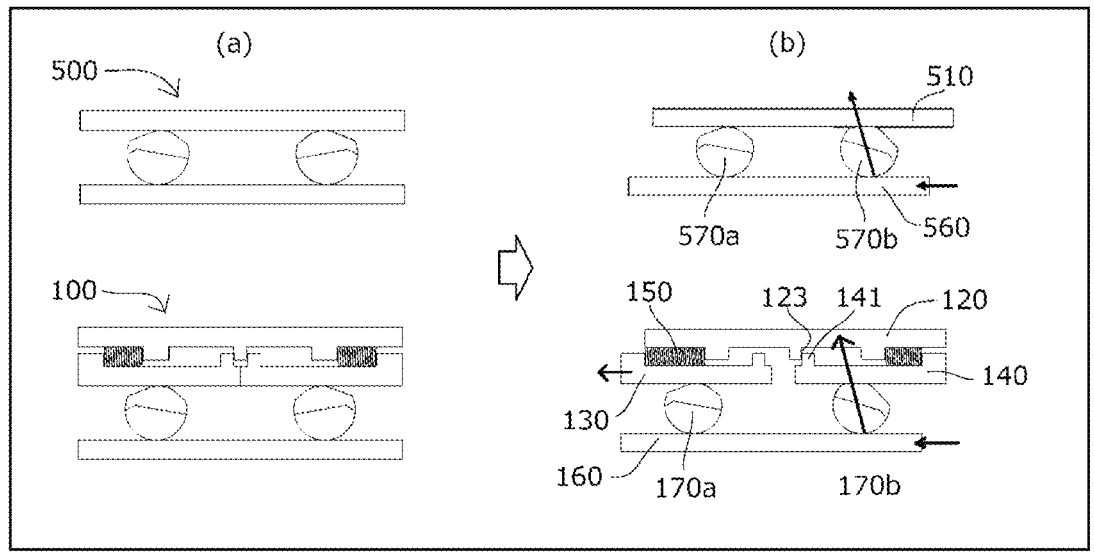
FIG. 8 is an illustrative view of an operation of the cam clutch of the present invention.

First, as illustrated in FIG. 8, in the two-way lock mode (a state where both of the first cams 170*a* and 570*a* and the second cams 170*b* and 570*b* are operable), when a drive force in the reverse rotation direction is applied to the inner races 160 and 560 in a state in (a) where the outer races 110 and 510 are fixed and the outer races 110 and 510 and the inner races 160 and 560 are under no load (relative rotational drive force is zero), as illustrated in (b), the inner races 160 and 560 slightly move in the reverse rotation direction, and the second cams 170*b* and 570*b* slightly tilt to be engaged, thereby generating torque counteracting the drive force and prohibiting rotation of the inner races 160 and 560 in the reverse rotation direction.

At this time, each of the first cams 170*a* and 570*a* is biased by a biasing means not shown so as to come into contact with the inner races 160 and 560, the first contact surface member 130, and the outer race 510 and, consequently, in the conventional cam clutch 500, the first cam 570*a* slips.

By contrast, in the cam clutch 100 according to the present invention, the first contact surface member 130 slightly moves in the reverse rotation direction with the help of the biasing force of the spring 150 without slipping with the first cam 170*a*.

Figure 9:
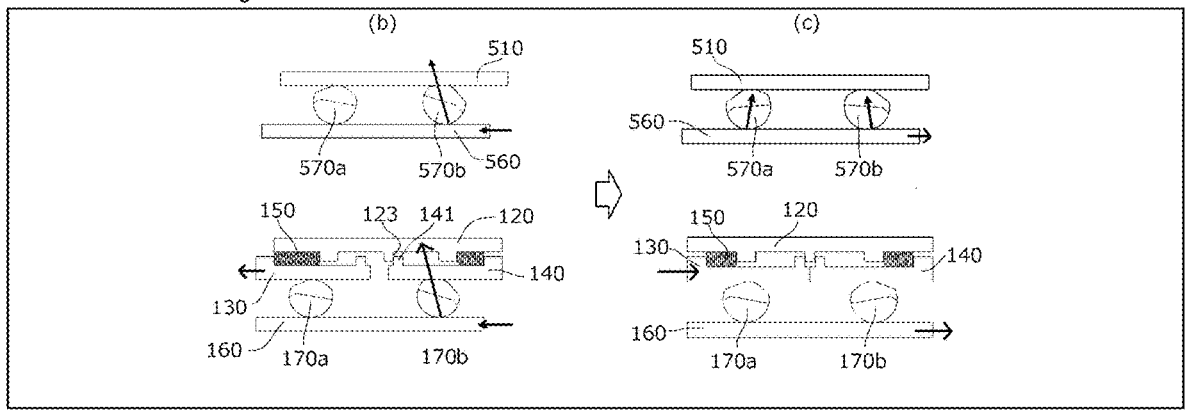
FIG. 9 is an illustrative view of the operation of the cam clutch of the present invention.

Next, as illustrated in FIG. 9, when the drive force in the reverse rotation direction is removed in a state in (b) and the outer races 110 and 510 and the inner races 160 and 560 are unloaded again, the tilts of the second cams 170*b* and 570*b* return to original positions to act so as to return the inner races 160 and 560 into the forward rotation direction.

At this time, in the conventional cam clutch 500, each of the first cams 570*a* immediately tilts and starts to be engaged, the tilt of each of the second cams 570*b* is not completely restored, the inner race 560 does not return to an initial position, and the first cam 570*a* and, as illustrated in (c), the second cam 570*b* come to rest at positions where the first cam 570*a* and the second cam 570*b* are in the same engaged state.

By contrast, in the cam clutch 100 according to the present invention, in the state in (b), the first contact surface member 130 has moved in the reverse rotation direction over the same distance as that over which the inner race 160 has moved, and therefore the first cam 170*a* does not tilt to be engaged, and the first contact surface member 130 moves in the forward rotation direction, while compressing the spring 150. As illustrated in (c), at a time point when the tilt of the second cam 170*b* is completely restored, each of the first cam 170*a* and the second cam 170*b* returns to an initial state ((a) of FIG. 8) where no jamming has occurred, as illustrated in (c).

Figure 10:
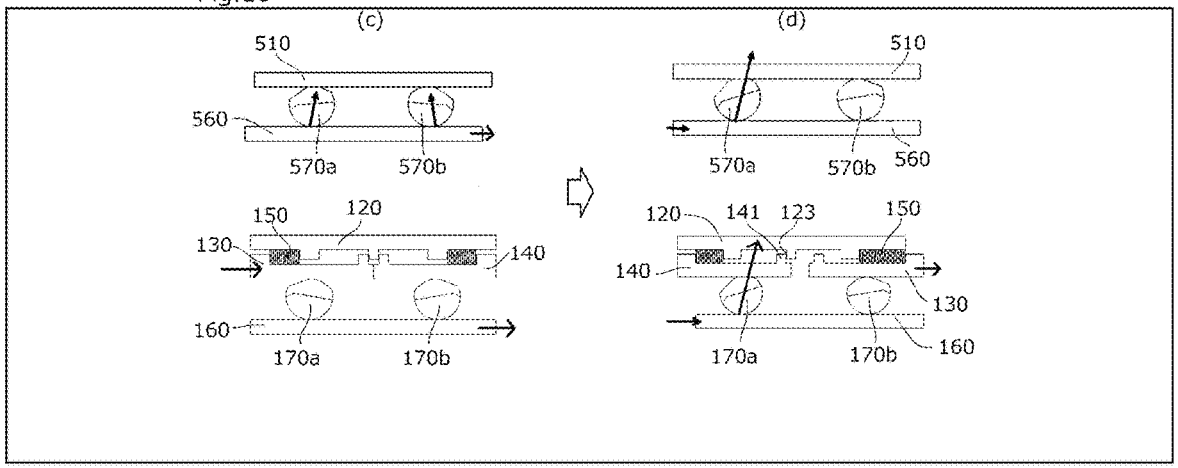
FIG. 10 is an illustrative view of the operation of the cam clutch of the present invention.
Figure 11:
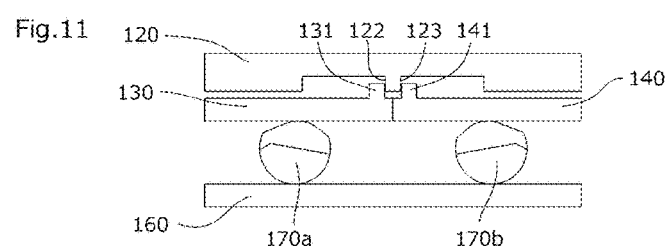
FIG. 11 is a schematic view of a cam clutch in still another embodiment of the present invention.

Next, as illustrated in FIG. 10, when a drive force in the forward rotation direction is applied to each of the inner races 160 and 560 in a state in (c), as illustrated in (d), the inner races 160 and 560 slightly move in the forward rotation direction and the first cams 170a and 570a slightly tilt to be engaged, thereby generating torque counteracting the drive force and prohibiting the rotation of the inner races 160 and 560 in the forward rotation direction.

At this time, in the conventional cam clutch 500, the tilt is restored so as to ease the engagement of the second cam 570a.

By contrast, in the cam clutch 100 according to the present invention, the second contact surface member 140 slightly moves in the forward rotation direction with the help of the biasing force of the spring 150 without slipping with the second cams 170b.

Furthermore, when the drive force in the forward rotation direction is removed and the outer races 110 and 510 and the inner races 160 and 560 are unloaded again, in the same manner as in the process from (b) to (c) of FIG. 9 described above, the tilt of each of the first cams 170a and 570a returns to the original state to act so as to return the inner races 160 and 560 into the reverse rotation direction.

At this time, in the conventional cam clutch 500, the second cam 570b immediately tilts and starts to be engaged, the tilt of the first cam 570a is not completely restored, and the first cam 570a and the second cam 570b come to rest at positions where the first cam 570a and the second cam 570b are in the same engaged state.

By contrast, in the cam clutch 100 according to the present invention, in a state in (d) of FIG. 10, the second contact surface member 140 has moved in the forward rotation direction over the same distance over which the inner race 160 has moved, and therefore the second cam 170b does not tilt to be engaged, and the second contact surface member 140 moves in the reverse rotation direction, while compressing the spring 150. At a time when the tilt of the first cam 170a is completely restored, each of the first cam 170a and the second cam 170b returns to an initial state ((a) of FIG. 8) where no jamming has occurred.

Therefore, in the conventional cam clutch 500, when the prohibition of the drive force occurs at least once in the two-way lock mode, even though an unloaded state (where a relative rotational drive force is zero) is reached, both of the first cam 570a and the second cam 570b are brought into a jammed state, and accordingly a large operation force is required by the operation mode switching mechanism that acts on the first cam 570a and the second cam 570b to change respective attitudes thereof and thereby switch the operation mode.

By contrast, in the cam clutch 100 according to the present invention, in an unloaded state (where the relative rotational drive force is zero), it is possible to establish a state where neither the first cam 170a nor the second cam 170b is engaged, and therefore the switching of the operation mode can smoothly be performed with an extremely light force.

While the embodiment of the present invention has been described heretofore in detail, the present invention is not limited to the embodiment described above, and various design changes can be made without departing from the present invention described in the scope of claims.

For example, in the embodiment described above, the spring 150, the friction members 151, and the like are each used as the biasing member but, as illustrated in FIG. 9 it may also be possible to move the first contact surface member 130 and the second contact surface member 140 only with a contact force between the first cam 170a and the second cam 170b without using the biasing member.

In addition, a shape of each of the first cam 170a and the second cam 170b may also be a so-called sprag shape as used in the first embodiment, or may also be a cylinder-based shaped as illustrated in other schematic views.

While the one first contact surface member 130 and the one second contact surface member 140 are arranged in parallel in the axial direction, a plurality of the first contact surface members 130 and a plurality of the second contact surface members 140 may also be arranged. It may also be possible form the first contact surface member 130 and the second contact surface member 140 in an interdigitating configuration such that respective portions thereof in contact with the cams are aligned on the same circumference, and arrange the first cams 170a and the second cams 170b on the same circumference.

REFERENCE SIGNS LIST 100, 500 Cam clutch
110, 510 Outer race
120 Outer race main body
121 Movement restricting groove
122 First movement restricting portion
123 Second movement restricting portion
124 Biasing member containing groove
130 First contact surface member
131 First movement restricting projection portion
132 First biasing projection portion
140 Second contact surface member
141 Second movement restricting projection portion
142 Second biasing projection portion
150 Spring (biasing member)
151 Friction portion (biasing member)
152 Compression spring (biasing member)
160, 560 Inner race
161 Inner race main body
170a, 570a First cam
170b, 570b Second cam

The invention claimed is:

1. A cam clutch comprising:
an outer race and an inner race that are coaxially provided to be capable of relative rotation with respect to each other; and
a plurality of cams arranged in a circumferential direction between the outer race and the inner race,
the plurality of cams including a first cam and a second cam that are engaged with the outer race and the inner race in mutually different directions,
the cam clutch further comprising:
an operation mode switching mechanism that acts on at least one of the first cam and the second cam to switch an operation mode,
the outer race or the inner race including an outer race main body or an inner race main body, and a first contact surface member and a second contact surface member that have cam contact surfaces respectively which come into contact with the first cam and the second cam,
the first contact surface member and the second contact surface member being provided at different positions in a rotation axis direction and configured to be independently movable in the circumferential direction relative to the outer race main body or the inner race main body,
the outer race main body or the inner race main body having a first movement restricting portion and a second movement restricting portion that restrict the movement of the first contact surface member and the second contact surface member in respective locking directions.

2. The cam clutch according to claim 1, wherein the outer race or the inner race has a biasing member that biases the first contact surface member and the second contact surface member in an unlocking direction.

3. The cam clutch according to claim 2, wherein the biasing member is a spring member having one end that comes into contact with the first contact surface member and another end that comes into contact with the second contact surface member.

4. The cam clutch according to claim 1, wherein the first contact surface member and the second contact surface member are configured to obtain moving forces in an unlocking direction from a frictional force between the first contact surface member and the second contact surface member, and the inner race or the outer race opposed thereto via the first cam and the second cam.

\* \* \* \* \*